US006678791B1

United States Patent
Jacobs et al.

(10) Patent No.: US 6,678,791 B1
(45) Date of Patent: Jan. 13, 2004

(54) SYSTEM AND METHOD FOR SESSION-AWARE CACHING

(75) Inventors: Lawrence Jacobs, Redwood City, CA (US); Xiang Liu, San Mateo, CA (US); Shehzaad Nakhoda, Palo Alto, CA (US); Zheng Zeng, Foster City, CA (US); Rajiv Mishra, Foster City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 272 days.

(21) Appl. No.: 09/923,072

(22) Filed: Aug. 4, 2001

(51) Int. Cl.[7] ............................ G06F 12/00; G06F 13/00

(52) U.S. Cl. ........................ 711/118; 709/203; 709/227; 711/133

(58) Field of Search ................................. 711/118, 133, 711/146, 144, 145; 707/104.1; 709/203, 217, 225, 227–228, 232

(56) References Cited

U.S. PATENT DOCUMENTS

| | | | |
|---|---|---|---|
| 5,611,049 A | | 3/1997 | Pitts ............................. 707/8 |
| 5,835,724 A | * | 11/1998 | Smith .......................... 709/227 |
| 6,029,175 A | | 2/2000 | Chow et al. .............. 707/104.1 |
| 6,085,234 A | * | 7/2000 | Pitts et al. ................... 709/217 |
| 6,085,249 A | * | 7/2000 | Wang et al. ................. 709/229 |
| 6,360,249 B1 | * | 3/2002 | Courts et al. ............... 709/203 |
| 6,502,106 B1 | * | 12/2002 | Gampper et al. ......... 707/104.1 |

OTHER PUBLICATIONS

Proactive caching of DNS records: addressing a performance bottleneck Cohen, E.; Kaplan, H.; Applications and the Internet, 2001. Proceedings. 2001 Symposium on Jan. 8–12, 2001.*

Candan, et al., Enabling Dynamic Content Caching for Database–Driven Web Sites. ACM SIGMOD May 21–24, 2001, Santa Barbara, CA, Copyright 2001 ACM.

Challenger, et al., A Scalable System for Consistently Caching Dynamic Web Data. IBM Research, Yorktown Heights, NY.

Challenger, et al., A Publishing System for Efficiently Creating Dynamic Web Content. IBM Research, Yorktown Heights, NY.

Datta, et al., A Comparative Study of Alternative Middle Tier Caching Solutions to Support Dynamic Web Content Acceleration. Proceedings of the $27^{th}$ VLDB Conference, Roma, Italy, 2001.

Degenaro, et al., A Middleware System Which Intelligently Caches Query Results. IBM Research, Yorktown Heights, NY, Copyright 2000, Springer–Verlag.

Wessels, et al., ICP and the Squid Web Cache, pp. 1–25. Aug. 13, 1997.

(List continued on next page.)

Primary Examiner—Mano Padmanabhan
Assistant Examiner—Pierre M. Vital
(74) Attorney, Agent, or Firm—Park, Vaughan & Fleming LLP

(57) ABSTRACT

A session-aware system and method for caching and serving data. A session-aware cache system stores data that may be designated or restricted for service to registered sessions or data requests that include session identifiers. A request for a restricted set of cached data that omits a session identifier is passed to an origin server (e.g., web server, data server) so that a session may be established and a session identifier assigned. The session-aware cache system may determine whether a session identifier of a data request is near expiration. If so, the request may be passed to the origin server so that the session lifetime may be extended.

33 Claims, 3 Drawing Sheets

OTHER PUBLICATIONS

Wessels, et al., Internet Cache Protocol (ICP), version 2, pp. 1–9, National Laboratory for Applied Network Research/UCSD, Sep. 1997.

Kantor, et al., Network News Transfer Protocol: A Proposed Standard for the Stream–Based Transmission of News, pp. 1–27. Feb. 1986.

Akamai white paper: Turbo–Charging Dynamic Web Sites with Akamai EdgeSuite, pp. 1–16, www.akamai.com, Sep. 23, 2002. Copyright 2001, Akamai Technologies, Inc.

A Distributed Infrastructure for e–Business–Real Benefits, Measurable Returns, pp. 1–28, www.akamai.com, Sep. 23, 2002. copyright 2000 and 2001, Akami Technologies, Inc.

Edge Sides Includes (ESI) Overview, pp. 1–7, www.esi.org, Sep. 23, 2002. Copyright 2001, Oracle Corporation, Akamai Technologies, Inc.

Tsimelzon, et al., Edge Sides Includes ESI–Accelerating E–Business Applications: Language Specification 1.0, pp. 1–12, www.esi.org/language spec 1–0.html, Sep. 23, 2002. Copyright 2001, Akamai Technologies, Oracle Corporation.

Nottingham, et al., Edge Side Includes ESI–Accelerating E–Business Applications: Edge Architecture Specification, pp. 1–6, www.esi.org/architecture spec 1–0.html, Sep. 23, 2002, Copyright 2001, Akamai Technologies, Oracle Corporation.

Jacobs, et al., Edge Side Includes ESI–Acceleratiog E–Business Applications: ESI Invalidation Protocol 1.0, pp. 1–13. www.esi.org/invalidation protocol 1–0.html, Sep. 23, 2002. Copyright 2001, Oracle Corporation.

Basu, et al., Edge Side Includes ESI–Accelerating E–Business Applications: JESI Tag Library 1.0 Specification: Tags for Edge–Side Includes in JSP, pp. 1–19. www.esi.org/jesit tag lib 1–0.html, Sep. 23, 2002. Copyright 2001, Oracle Corporation, Akamai Technologies, Inc.

\* cited by examiner

SYSTEM AND METHOD FOR SESSION-AWARE CACHING

BACKGROUND

This invention relates to the field of computer systems. More particularly, a system and methods are provided for caching and serving data without sacrificing session awareness or losing session-specific information.

Many data-serving systems or applications (e.g., databases, web servers) need or attempt to distinguish between different users or different user sessions. Doing so allows the system or application, for example, to identify new users or customers, track a user's purchases, examine her browsing habits, etc. With this individualized information, the system can maintain accurate user profiles, tailor its presentation of information to a user's tastes, apply user demographics to improve the system, and so on.

In order to obtain this information, data-serving systems may assign session identifiers to user sessions, thereby allowing one user's requests or actions to be distinguished from another's. In particular, the first time a user connects to a system, the system may assign a session identifier, which is thereafter provided by the user (or a user agent such as a browser) with each data request. Session identifiers are often assigned expirations so that a session will be torn down after a certain period of user inactivity.

Data-serving systems designed to capture user—or session-specific information often are unable to use caches to serve their data more rapidly, because caches are typically configured to serve their data in response to any request for the data—without enforcing or requiring session identifiers. If such a data-serving application employed a cache, user state transitions or other information could be lost or not captured by the data server (e.g., web server, database). For example, a user's first request would be intercepted and served by the cache without assigning a session identifier. If most or all of the user's requests are handled by the cache, the data server may never learn of the user's contact, his or her pattern of activity, etc.

Further, because traditional caches are not configured to be session-aware or to enforce session identification, the use of a cache in a data-serving environment may cause active user sessions to expire. In particular, if a data server assigns a user session a session identifier that expires after a given period of time, and the user's requests are thereafter served by the cache (i.e., instead of the data server), the user's session may expire because the data server does not know of the user's ongoing activity with the cache.

Thus, what is needed is a session-aware cache system for enforcing session identification and ensuring that a data server or application receives necessary user or session information.

SUMMARY

In one embodiment of the invention a cache system and methods of serving cached data are provided for ensuring that user sessions are distinguished from each other and that significant state transitions are captured. Significant state transitions may include a user's connection to a data-serving environment, disconnection from the environment, a particular pattern of activity (e.g., data requests), etc. A cache system is configured, in this embodiment, to ensure that an origin server (e.g., database, data server, web server) is informed of the transitions. Illustratively, a user request that embodies or reflects a significant state transition may be passed to the origin server for action or, alternatively, the cache may handle the request but separately notify the origin server of the activity.

In one embodiment of the invention, a cache system or cache server is configured to periodically or regularly pass client requests to the origin server, or otherwise inform the origin server of the client's continuing activity, so that a session identifier assigned to the client can be refreshed or prevented from expiring. Thus, a first data request from a client may be forwarded to the origin server so that the origin server is made aware of the new connection and can assign a session identifier and/or take other action. Thereafter, the cache may pass periodic or occasional requests to the data server in order to keep the client session alive, inform the data server of significant activity, and so on.

In another embodiment, if a request is received for a cached data item or set of data, the cache system determines whether service of the data item has been restricted to registered client sessions. If so, then the cache system may only serve the cached data item for requests that include session identifiers. If the received request does not have a session identifier (e.g., it is a new connection), the request is passed to the origin server so that a session identifier may be assigned.

DETAILED DESCRIPTION

Figure 1:
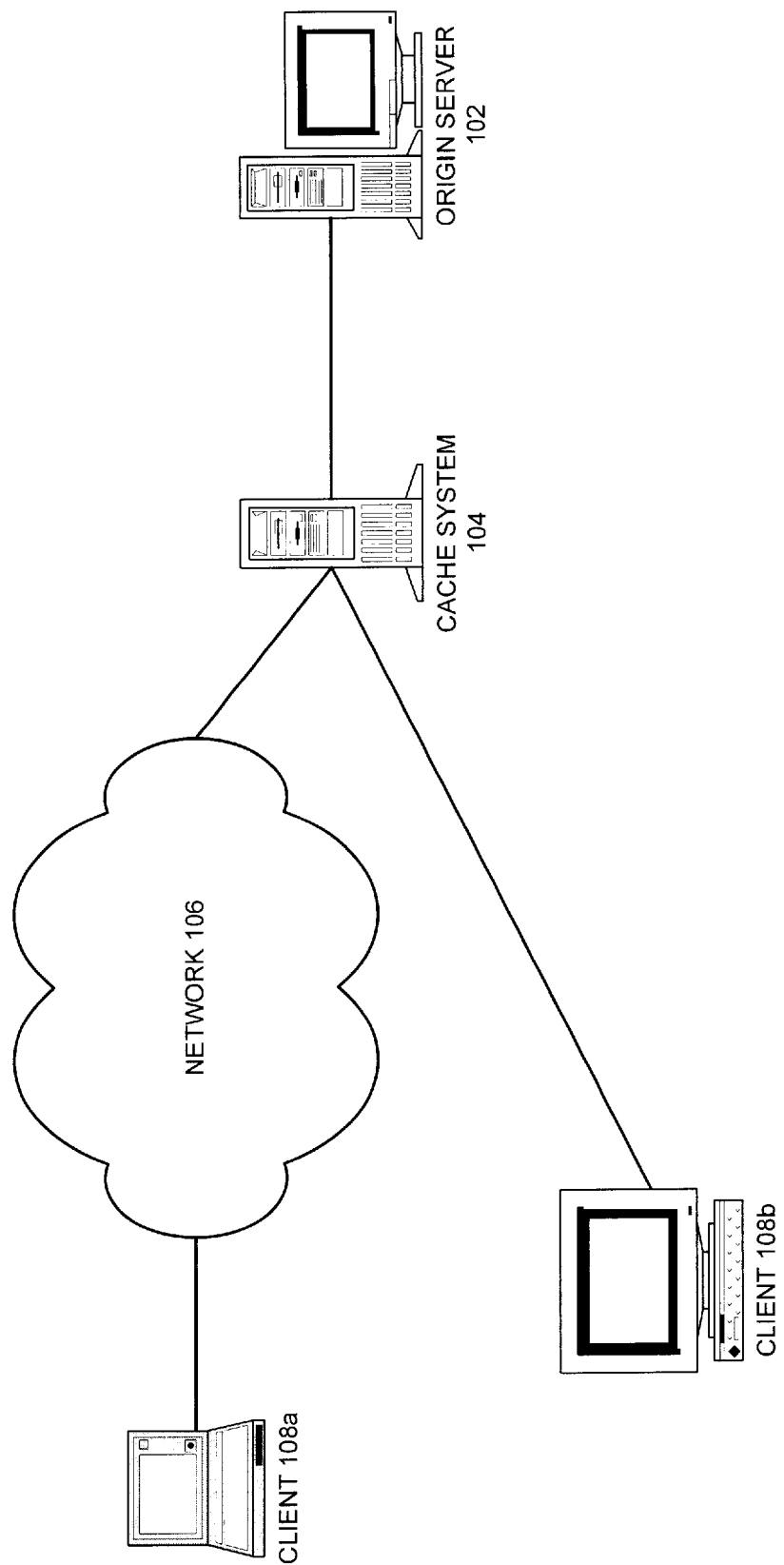
FIG. 1 is a block diagram depicting one data-serving environment in which a session-aware cache system may ensure that session-specific information is gathered, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In embodiments of the invention described herein, systems and methods are described for caching and serving data (e.g., for clients, users or other requestors) without losing any pertinent information desired by an origin server (e.g., web server, data server, database) that originates the data. The cache systems described herein may thus be considered to be "session-aware" in that they are configured to provide state transition data, user connection data, user activity and any other information needed by an origin server. Such a cache may thus be added to a traditional data-serving system that tracks or otherwise requires session-specific information.

The data cached in an embodiment of the invention may comprise web pages, portions of a web page, data from a database, etc., and may take the form of text, audio, video and so on, which may be formatted according to HTML (Hypertext Markup Language), XML (Extensible Markup Language), or some other language or protocol.

In one embodiment of the invention, a session-aware cache enforces the use of session identifiers by ensuring that designated cached data items are served, from the cache, only for data requests that include session identifiers. In particular, when a data request is received for a cached data item that has been designated (e.g., by a system administrator, web server, database administrator, origin server), the request is examined or parsed to determine if it includes a session identifier. If so, the data item may be served from the cache. Otherwise, the request may be passed to the origin server for service (and assignment of a session identifier).

In another embodiment of the invention, a session-aware cache is configured to determine whether a session (e.g., client session, user session) for which it is serving cached data is near its expiration time. Thus, in an environment in which user sessions are configured to expire (e.g., after a set period of inactivity at an origin server), the cache may be configured to pass data requests to the origin server for sessions that are nearing their expirations, even if the requests are for data items that are cached. The origin server may then observe the user's continued activity, and therefore extend the session's lifetime.

In one embodiment of the invention, a session-aware cache may be considered dynamic in that it responds differently to different requests—e.g., based on the request or the requested data. A traditional cache system, by way of contrast, may be considered static in that it acts in the same manner regardless of the form or structure of a request and regardless of the cached or requested data. For example, a traditional cache system may simply examine a data identifier (e.g., Uniform Resource Identifier or Locator) of a data request and serve a cached data item matching the identifier, without determining whether the data item has been restricted for service to particular requests or request formats, whether additional information in the request should be considered in selecting a more appropriate data item, etc. In this embodiment of the invention, however, a session-aware cache system receives requests for one set of data or one data item from different clients/user sessions, but the requests may differ in their content or description of the desired data. In particular, the requests may include different session identifiers for identifying a client or user session to an application, web site, database, etc. Illustratively, a session identifier in an http (Hypertext Transport Protocol) request may be in the form of a "cookie," may be embedded as part of a URI (Uniform Resource Identifier) identifying the desired data, or may take some other form.

U.S. patent application Ser. No. 09/923 102, filed Aug. 4, 2001 and entitled "System and Method for Serving One Set of Cached Data for Differing Data Requests" describes a system and methods for caching, serving and/or customizing a set of data for service in response to different data requests, and is hereby incorporated by reference.

FIG. 1 depicts an illustrative computing environment in which an embodiment of the invention may be implemented. Although the illustrated environment includes just one cache system and one data server, embodiments of the invention may be implemented in environments that include multiple cache systems and/or multiple data servers.

In FIG. 1, origin server 102, which may be a web server, application server, database server, or other server system, stores data that may be served to clients 108a, 108b. Clients 108a, 108b may comprise any type of computing device capable of communication with another computing device. Clients 108a, 108b may therefore comprise desktop, workstation, portable or hand-held devices, or suitably equipped communication devices (e.g., web-enabled telephones). The clients may further, or alternatively, comprise browsers or other user interfaces operated on such computing devices.

Cache system 104 caches data stored on or maintained by origin server 102, for faster serving to clients. Cache system 104 is coupled to clients 108a, 108b via any suitable communication links, such as network 106 (which may be the Internet) or a direct link. Although origin server 102 and cache system 104 are depicted as separate computers in FIG. 1, in an alternative embodiment of the invention a cache system may reside on the same machine as the origin server, or vice versa. Further, cache system 104 may be implemented as a cache cluster, a partitioned cache, or some other cooperative collection of caches, which may be geographically or logically dispersed within a LAN, WAN or other communication network.

A Session-Aware Cache

Figure 2:
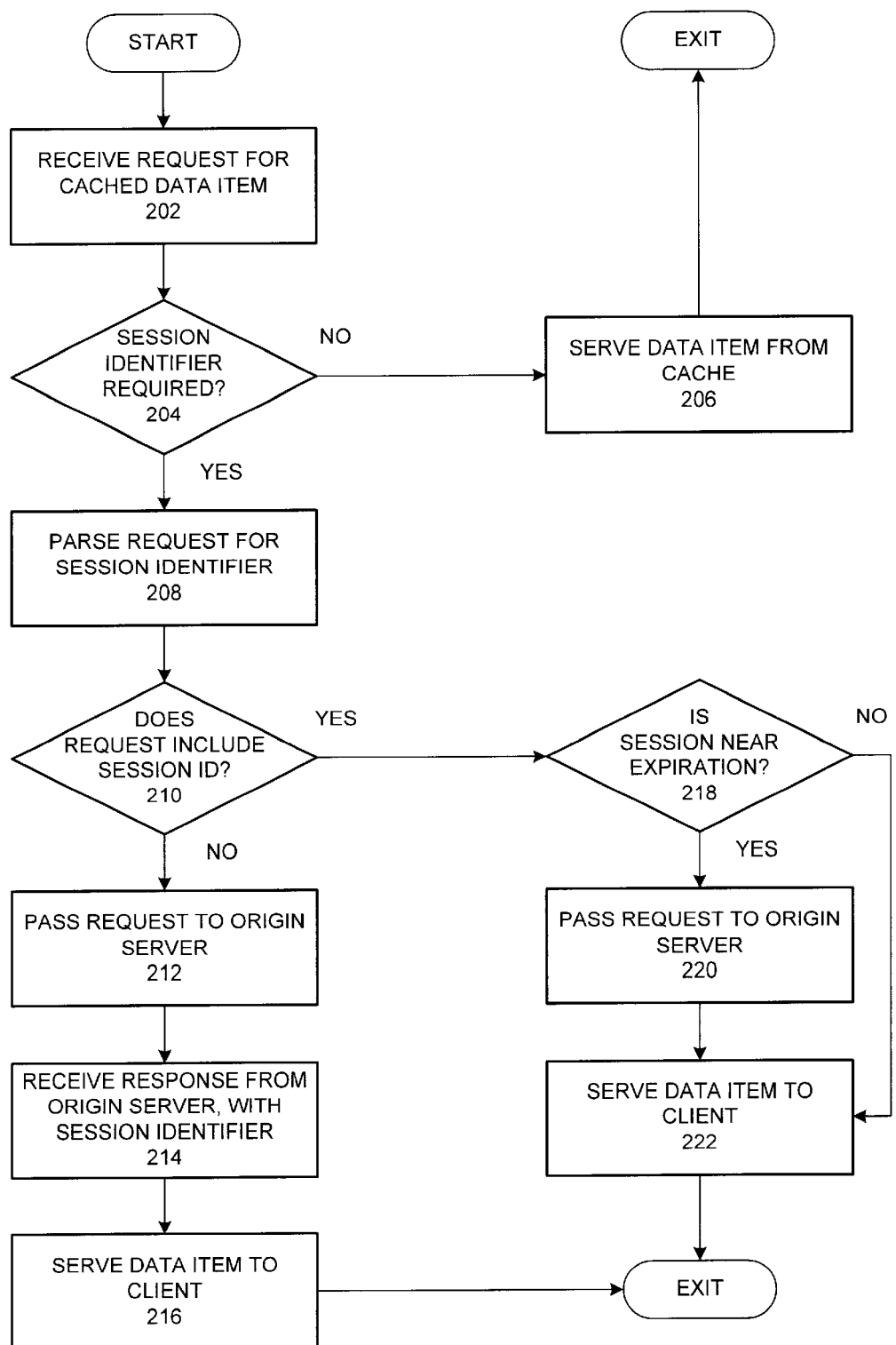
FIG. 2 is a flowchart illustrating one method of serving cached data from a session-aware cache in accordance with an embodiment of the invention.

FIG. 2 demonstrates one method of operating a cache system in a data-serving environment that requires session-specific information, according to one embodiment of the invention. The session-specific information may be required by an origin server (such as origin server 102 of FIG. 1) in order to tailor service for individual clients (e.g., users, user agents), track client activity, etc.

In the illustrated method, the cache system is configured to examine a data request for specified information, such as a session identifier. In other embodiments of the invention, other information may be examined or searched for, such as a client identifier, type of user agent or browser, some other request parameter, etc. Further, the cache system is configured to enforce session identification by passing requests that omit session identifiers to the origin server for service (and assignment of a session identifier). In one alternative embodiment, the cache system may be configured to assign a unique session identifier to a client in response to a request that has no session identifier (and notify the origin server of the assigned identifier).

In state 202, a data request is received at the cache system, from a client, for a data item or set of data stored in the cache system. Illustratively, the desired data is identified in the request by a data identifier in the form of a URL (Uniform Resource Locator), network address, etc.

In state 204, the cache system determines whether service of the data item is restricted or limited to registered sessions or requests that include session identifiers. Information indicating that a data item is restricted may be stored at the time the data item is cached, and may take the form of an entry in a table or other data structure, a flag, parameter or other indicator within or associated with the data item, etc. In the illustrated embodiment of the invention, a data item may be restricted by a system administrator, database administrator, web site manager or other entity. In this embodiment the restriction indicator, or information indicating the restricted nature of a data item, may be stored on the cache system or a system coupled to the cache system.

In state 206, service of the data item is not restricted to registered sessions or requests having session identifiers, and so the requested data item is served from the appropriate cache memory and the procedure ends.

In state 208, the cache system parses or examines the request, and/or the description or identifier of the data item, to find a session identifier. Illustratively, a session identifier in this embodiment of the invention may take the form of a cookie (e.g., a parameter of the request), may be embedded within or appended to the data item identifier (e.g., URL), or may be provided in some other form.

In state 210 the cache system determines whether a session identifier was included with the request. If the request does include a session identifier, the method proceeds to state 218; otherwise, the method continues at state 212.

In state 212, the cache system forwards the data request to the origin server, so that the origin server may assign an appropriate session identifier. Illustratively, the cache system also provides the requested data item.

In state 214 the cache system receives a response from the origin server, which includes the requested data item and a newly assigned session identifier. In one alternative of the embodiment, however, if a valid version of the requested data item is stored in the cache system, then the origin server may be configured to only provide a session identifier.

In state 216 the cache system serves the requested data item to the client, along with the session identifier. Illustratively, the assigned session identifier will be returned by the client with any subsequent data requests. The cache system may also cache the version of the data item received from the origin server. The illustrated method then ends.

In one alternative embodiment of the invention, the cache system may be configured to assign session identifiers to a (new) user session in response to the receipt of a data request that does not include a session identifier. Such a session identifier may be returned to the client with the requested data item and may also be passed to the origin server.

In state 218, the data request includes a session identifier and so the cache system may serve the requested data item from cache memory. However, in this embodiment of the invention the cache system is also configured to determine if a user session is near its expiration time. As one skilled in the art will recognize, an origin server may assign lifetimes to new sessions and session identifiers (e.g., thirty minutes). If the session or associated client is inactive (e.g., the origin server receives no requests for the session) for that period of time, the session may be terminated, the session identifier may then be considered invalid and, if a request is later received for that session, a new session (and session identifier) may have to be generated. However, each time the origin server receives a request or other contact from the session during the session's lifetime, the session expiration may be reset or extended. If data requests received from a registered session are continually satisfied by the cache system, without having to forward any to the origin server (i.e., because the cache contains all the requested data), the origin server may erroneously consider the client inactive.

Thus, in state 218 the cache system determines whether the session associated with the data request is approaching its expiration. Various criteria may be used to determine if expiration is "near." For example, the cache system may determine whether the time remaining until expiration is less than a threshold, whether a certain period of the lifetime has elapsed or remains, etc. The cache system may store information regarding the expiration of a session (e.g., if received from the origin server or if the session identifier is generated by the cache system), or the cache system may query the origin server to determine if a session's expiration is near. As another alternative, the cache system may track the amount of time between data requests that it forwards to the origin server for a particular session. Because the origin server will reset the session lifetime for each such request, the cache system may be able to estimate how much of a session's lifetime has elapsed or remains.

If the session is considered near expiration, the illustrated method continues at state 220; otherwise it advances to state 222.

In state 220, the data request is passed to the origin server so that the server can reset the session's expiration.

In state 222, the cache system serves the requested data item to the client. The version of the data item that is served may be the version that was cached or the version received from the origin server in response to the request forwarded in state 220.

In one alternative embodiment of the invention, in states 220–222 the cache system may simply notify the origin server that the specified session was active, instead of forwarding the request to the server. After state 222, the illustrated method ends.

Multi-Version Caching

In one embodiment of the invention, a cache such as cache system 104 of FIG. 1 may be configured to serve, or facilitate the service of, different versions of a data item (e.g., web page, image, collection of data) in response to different client requests. Illustratively, each request for the data item may use an identical or similar data identifier (e.g., URI, URL) to identify the desired data. A traditional cache, if employed in this situation, would likely serve the same version of the data item for each request despite the availability of multiple versions. In contrast, a cache provided in this embodiment of the invention may examine any other portion(s) of a request (e.g., cookies, parameters) to determine which version of the data item is most responsive to the request. The cache may also access other information external to the request (e.g., by querying the client or origin server).

Requests for different data items may be disambiguated differently (e.g., using different request parameters). A disambiguation policy may be generated and associated with a data item in order to identify the information to be used to select an appropriate version of the data item. Illustratively, when a data item having multiple versions is stored in the cache, its policy is also stored. And, when a cache search or lookup is done in response to a client request, if the desired data item has a policy, that policy (or an identification or location of the policy) is returned. If no disambiguation is needed (i.e., one form of the data item may be served for all requestors), the search or lookup will return the data item (or an identification or location of the data item). If, of course, nothing is returned in response to the search or lookup, this may constitute a cache miss and the request may be forwarded to the origin server.

The information used to disambiguate a request may comprise virtually any information or parameter. Some examples include: a country designation, a language, a type of user agent (i.e., browser), a version or particular type of user agent, a cookie, etc. A cookie may identify a particular class of user or client, a client session, etc. In an electronic commerce system, for example, a cookie may identify a "level" of user or client (e.g., gold, silver). Depending on a user's level, different product prices may be offered to the user, different user options or services may be available, etc. Thus, when the user connects to the system and requests a home page, or accesses a particular page, the particular version of the requested page that is served by the cache may depend on the client level.

In one embodiment of the invention the cache lookup for a client request may be performed in multiple steps or phases. In particular, because many or most client requests may need no disambiguation (e.g., only one version of the requested data items exist), a first lookup may be performed using just the data identifier of the request (e.g., a URI or URL). If the lookup is unsuccessful or nothing is returned, this may indicate a cache miss. Otherwise, the result of the lookup will comprise (or identify) the desired data item (if no disambiguation is needed) or the policy to be applied to disambiguate the request.

If the search returns or identifies the requested data item, it is served. If it is a policy that is identified, it is applied. In particular, the information needed to select a particular version of the data item is retrieved, and another cache lookup is performed with the additional information. Thus, client requests in which the data identifier is sufficient to identify the desired data item can be handled quickly. And, more complex requests—where additional information or processing is needed for disambiguation—will not be unduly delayed.

In one embodiment of the invention, a cache is configured to store data items at the object level (e.g., separate images, news stories, icons, banners, data sets). Illustratively, even though a client may submit a request for a single page of data, that page may include many separate objects and the one request for the page may spawn requests for each individual object. If most objects in the page are identical for many or all users, it may be more efficient to allow each such item to be retrieved quickly through a simple lookup rather than including multiple parameters in each lookup.

In one alternative method of serving multi-version data items from a cache, a first lookup may employ the data identifier and some or all of the available disambiguating information. For example, a default implementation of this method may use a default set of parameters from a data request (e.g., more than just the data identifier). In another implementation, a policy for the data item may first be retrieved and the disambiguating information specified in the policy may be used to construct an appropriate first lookup. This alternative method of the invention may be well suited for a system in which many or most data requests are for multi-version data items.

Illustratively, a cache according to one embodiment of the invention employs a suitable interface with which an administrator or system manager may specify which data items have multiple versions, submit policies, update or remove policies, etc. For example, such an interface may allow an administrator to specify a data item (e.g., by URL or network address) or a group of data items (e.g., by a pattern such as "page*.html" or "xyzzy.com/images/*.jpg"). The administrator may then specify which additional parameters of a client request, besides the data identifier, are required or desired for disambiguation. Or, the administrator may specify that no additional parameters are required. The interface may also allow the administrator to specify or provide a pattern or rule for determining which version of a data item to serve for which value(s) of the disambiguating information.

Further, a cache lookup table that is searched when a client request is received may be configured for two or more types of entries. For example, a first type of entry, for requests requiring no disambiguation, may comprise or identify the requested data item (with a pointer, file name, URL, etc.). A second type of entry may comprise a tag, marker, indicator or other means of indicating that disambiguation is required before an appropriate version of the requested data item can be served. This type of entry may also comprise or identify the policy to be applied to determine the appropriate version. The policy itself would then specify the parameter(s) or other information to be included in a second lookup. If the second lookup includes all of the necessary information, an instance of the first type of entry should be returned and identify the version of the data item to be served for this request.

Figure 3:
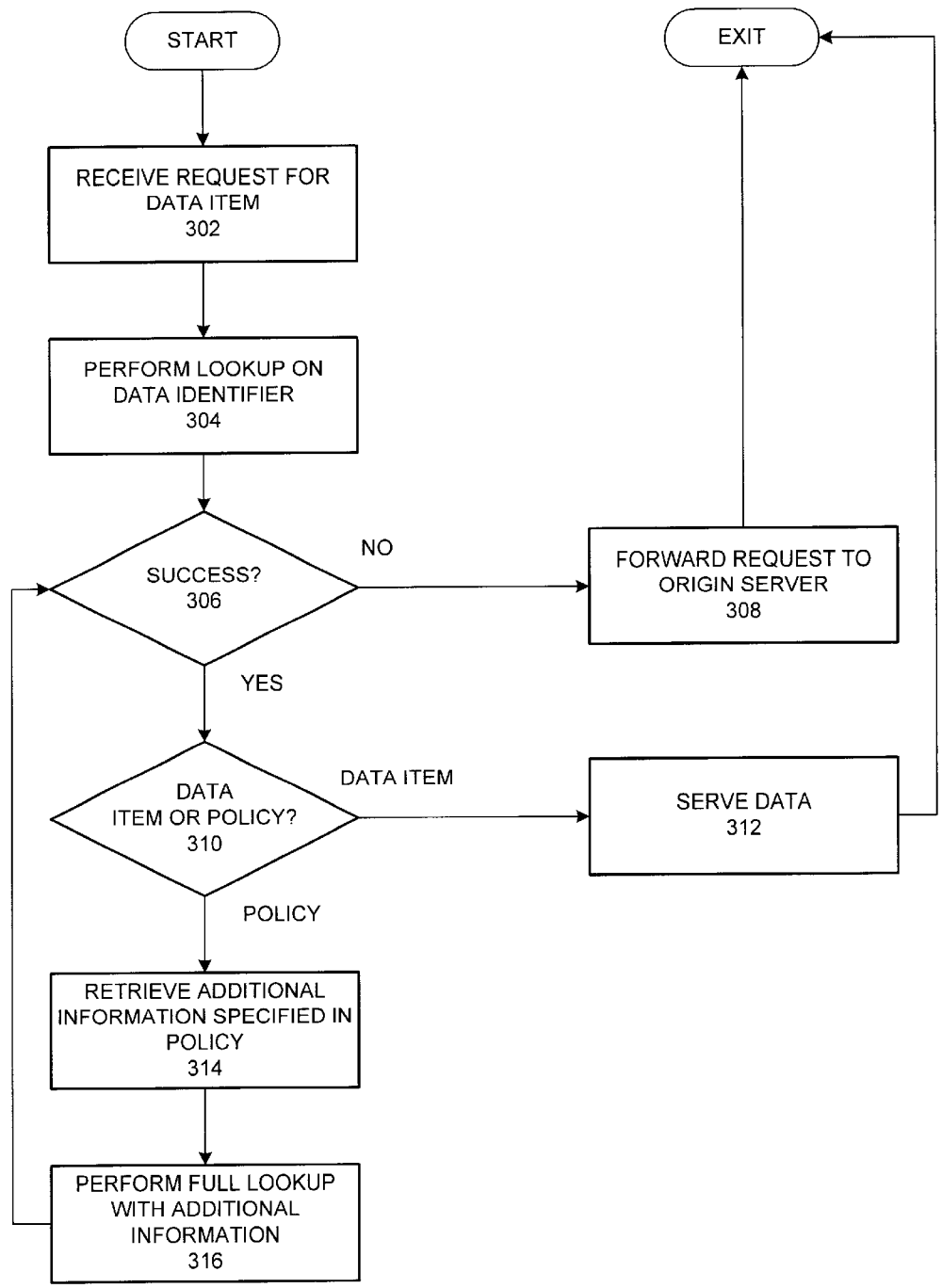
FIG. 3 is a flowchart illustrating one method of identifying and serving one of multiple versions of a requested data item, according to one embodiment of the invention.

FIG. 3 illustrates one method of operating a cache for serving multiple versions of one data item or set of data, according to one embodiment of the invention. A request for a multi-version data item may be disambiguated using any information available in the request and/or other information retrieved from the cache, origin server, client, etc.

In state 302 of the illustrated embodiment, a request is received at the cache from a client. The request may be for a web page, a discrete portion of a web page, a set of data from a database, an image, etc. The request includes a data identifier, in the form of a Uniform Resource Locator (URL), network address, file name or other form, that identifies the basic data item being requested. The data identifier is extracted or copied from the request.

In state 304 a first lookup is performed in the cache, based on the data identifier. This lookup may be performed in a cache lookup table, an index, a cache memory, etc.

In state 306, if the lookup is successful (i.e., a result is returned), the illustrated method of the invention advances to state 310. Otherwise the method continues at state 308.

In state 308, the lookup was unsuccessful, meaning that the cache does not currently store any data items matching the parameters of the search (e.g., the cache has no data items matching the data identifier). Therefore, the request is forwarded to the origin server for satisfaction. If the origin server locates and returns the requested data item or a particular version of the data item, it is served to the client and may also be cached. The method then ends after state 308.

In state 310, the lookup was successful in that some result was returned. However, a successful lookup in this embodiment of the invention may return either the requested data item (or an identifier of, or a pointer to, the data item) or, if disambiguation between multiple versions of the data item is necessary, a policy identifying additional information for selecting the appropriate version (e.g., an identifier of, or a pointer to, the applicable policy). If the lookup returned a policy, then the illustrated method proceeds to state 314; otherwise, the method continues at state 312.

In state 312, the requested data item has been identified and found in the cache and is therefore served from the cache in response to the request. The request has thus been satisfied and the method therefore ends.

In state 314, a policy has been identified for determining which, of multiple versions of the requested data item, is to be served. Therefore, the policy is applied or examined to identify the additional information needed to select the appropriate version. The policy may be stored in the cache or may be retrieved from another location. The additional information specified in the policy is then retrieved—from the request and/or elsewhere (the client, origin server). For example, the policy may specify that a particular cookie or parameter value of the request is needed to determine which version of the data item is most responsive.

In state 316, the additional information is used to construct and execute another lookup in the cache. After state 316, the illustrated method may return to state 306. In summary, however, the second lookup will generally, in this embodiment, return either the data item or nothing. If nothing is returned, a cache miss has occurred and the request is forwarded to the origin server. If the data item is returned (i.e., a particular version of the data item), then it is served. However, in one embodiment of the invention, the second lookup may return another policy, thereby requiring even more information to be retrieved in order to perform yet another lookup.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of operating a cache to serve data in response to a data request, comprising:

receiving at a cache a first request from a first client for a first set of data;

determining whether service of said first set of data is restricted to data requests having session identifiers;

determining whether said first request includes a session identifier; and if said service of said first set of data is restricted and said first request does not include a session identifier, forwarding said first request to a data server.

2. The method of claim 1, further comprising:

receiving a response from the data server, wherein said response includes a first session identifier; and serving said first set of data with said first session identifier to the first client.

3. The method of claim 2, wherein said response further includes said first set of data, the method further comprising:

storing said first set of data in a cache memory.

4. The method of claim 2, further comprising:

receiving at the cache a second request from the first client, wherein said second request includes said first session identifier and said first session identifier has an expiration;

determining whether said expiration should be extended; and if said expiration should be extended, forwarding said second request to the data server.

5. The method of claim 4, wherein said determining whether said expiration should be extended comprises requesting said expiration from the data server.

6. The method of claim 4, wherein said determining whether said expiration should be extended comprises retrieving said expiration from a memory of the cache.

7. The method of claim 4, wherein said determining whether said expiration should be extended comprises identifying a time interval that has passed since a previous request from the first client was forwarded to the data server.

8. The method of claim 2, further comprising:

receiving at the cache a second request from the first client, wherein said second request includes said first session identifier and said first session identifier has an expiration;

determining whether said expiration should be extended; and if said expiration should be extended, notifying the data server of said second request so that the data server may extend said expiration.

9. The method of claim 1, further comprising:

if said service of said first set of data is restricted and said first request includes said session identifier, serving said first set of data to the first client in response to said first request.

10. The method of claim 1, further comprising prior to said receiving a first request:

receiving from the data server said first set of data; and storing an indicator configured to indicate that said first set of data is only to be served in response to requests that include session identifiers.

11. The method of claim 10, wherein said determining whether service of said first set of data is restricted comprises examining said indicator.

12. A method of operating a cache system, comprising:

receiving at the cache system a first request for a first set of data;

determining whether said first set of data may be served in response to a request that does not include a session identifier;

examining said first request to determine if said first request includes a session identifier;

obtaining a first session identifier if said first set of data is only servable in response to a request that includes a session identifier and said first request does not include a session identifier; and serving said first set of data in response to said first request.

13. The method of claim 12, wherein said serving comprises:

serving said first session identifier with said first set of data.

14. The method of claim 13, wherein said obtaining comprises:

forwarding said first request to a data server configured to maintain said first set of data.

15. The method of claim 14, wherein said obtaining further comprises:

receiving from the data server said first session identifier.

16. The method of claim 13, wherein said obtaining comprises generating said first session identifier at the cache system.

17. The method of claim 12, further comprising:

receiving at the cache a second request from the first client, wherein said second request includes said first session identifier and said first session identifier has an expiration;

determining whether said expiration should be extended; and if said expiration should be extended, forwarding said second request to the data server.

18. The method of claim 17, wherein said determining whether said expiration should be extended comprises requesting said expiration from the data server.

19. The method of claim 17, wherein said determining whether said expiration should be extended comprises retrieving said expiration from a memory of the cache.

20. The method of claim 17, wherein said determining whether said expiration should be extended comprises identifying a time interval that has passed since a previous request from the first client was forwarded to the data server.

21. The method of claim 12, further comprising:

receiving at the cache a second request from the first client, wherein said second request includes said first session identifier and said first session identifier has an expiration;

determining whether said expiration should be extended; and if said expiration should be extended, notifying the data server of said second request so that the data server may extend said expiration.

22. A computer readable storage medium storing instructions that, when executed by a computer, cause the computer to perform a method of operating a cache to serve data in response to a data request, the method comprising:

receiving at a cache a first request from a first client for a first set of data;

determining whether service of said first set of data is restricted to data requests having session identifiers;

determining whether said first request includes a session identifier; and if said service of said first set of data is restricted and said first request does not include a session identifier, forwarding said first request to a data server.

23. A computer readable storage medium storing instructions that, when executed by a computer, cause the computer to perform a method of operating a cache to serve data in response to a data request, the method comprising:

receiving at the cache system a first request for a first set of data;

determining whether said first set of data may be served in response to a request that does not include a session identifier;

examining said first request to determine if said first request includes a session identifier;

obtaining a first session identifier if said first set of data is only servable in response to a request that includes a session identifier and said first request does not include a session identifier; and serving said first set of data in response to said first request.

24. A cache system, comprising:

a memory configured to store a first data item;

an indicator configured to indicate, in a first state, that said first data item may only be served in response to data requests that include session identifiers; and a processor configured to forward a first data request for said first data item to a data server if said indicator is in said first state and said first data request does not include a session identifier.

25. The cache system of claim 24, further comprising:

a parser configured to parse said first data request to determine if said first data request includes a first session identifier.

26. The cache system of claim 25, further comprising:

means for determining whether said first session identifier has an expiration.

27. The cache system of claim 26, wherein said processor is further configured to forward said first data request to the data server if said first session identifier is configured to expire within a predetermined period of time.

28. The cache system of claim 24, further comprising:

a timing module configured to determine, if said first data request includes a first session identifier having an expiration, whether said expiration should be extended.

29. The cache system of claim 29, further comprising:

a communication module configured to forward said first data request to the data server if said expiration should be extended.

30. The cache system of claim 28, further comprising:

a communication module configured to notify the data server of said first data request if said expiration should be extended.

31. A cache system, comprising:

storage means for caching a first set of data from a data server;

indicating means for indicating whether said first set of data may be served only for data requests having session identifiers;

parsing means for parsing a first data request to determine whether said first data request includes a first session identifiers means for forwarding said first data request to the data server if said first set of data may be served only for data requests having session identifiers;

means for determining whether a session identifier has an expiration; and means for determining whether an extension is needed for a session identifier having an expiration.

32. The cache system of claim 31, further comprising:

means for forwarding to the data server a second data request if the second data request has a second session identifier and said second session identifier has an expiration.

33. The cache system of claim 31, further comprising:

means for forwarding to the data server a notification of a second session identifier if said second session identifier has an expiration and needs an extension.

* * * * *

UNITED STATES PATENT AND TRADEMARK OFFICE
CERTIFICATE OF CORRECTION

PATENT NO. : 6,678,791 B1  Page 1 of 1
DATED : January 13, 2004
INVENTOR(S) : Jacobs et al.

It is certified that error appears in the above-identified patent and that said Letters Patent is hereby corrected as shown below:

<u>Title page,</u>
Item [73], Assignee, should read as:

-- [73] Assignee: Oracle International Corporation
              Redwood Shores, CA (US) --

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,678,791 B1
DATED        : January 13, 2004
INVENTOR(S)  : Jacobs et al.

It is certified that error appears in the above-identified patent and that said Letters Patent is hereby corrected as shown below:

Column 12,
Line 43, replace "identifiers" with -- identifier; --.

Signed and Sealed this

Fourteenth Day of September, 2004

JON W. DUDAS
*Director of the United States Patent and Trademark Office*